(12) United States Patent
Kim et al.

(10) Patent No.: US 8,875,310 B2
(45) Date of Patent: Oct. 28, 2014

(54) SYSTEM AND METHOD OF PROTECTING DIGITAL MEDIA CONTENTS

(75) Inventors: Eunbum Kim, Gyeonggi-Do (KR); Kwanghoon Kim, Seoul (KR)

(73) Assignee: Fasoo.com Co., Ltd., Seoul (KR)

( * ) Notice: Subject to any disclaimer, the term of this patent is extended or adjusted under 35 U.S.C. 154(b) by 187 days.

(21) Appl. No.: 13/256,993

(22) PCT Filed: Mar. 19, 2010

(86) PCT No.: PCT/KR2010/001720
§ 371 (c)(1),
(2), (4) Date: Sep. 16, 2011

(87) PCT Pub. No.: WO2010/107279
PCT Pub. Date: Sep. 23, 2010

(65) Prior Publication Data
US 2012/0011596 A1    Jan. 12, 2012

(30) Foreign Application Priority Data

Mar. 19, 2009  (KR) ........................ 10-2009-0023630

(51) Int. Cl.
*G06F 7/04*     (2006.01)
*H04L 29/06*    (2006.01)
(Continued)

(52) U.S. Cl.
CPC ................ *G06F 21/10* (2013.01); *H04L 63/08* (2013.01); *G06F 21/121* (2013.01);
(Continued)

(58) Field of Classification Search
CPC ... G06F 21/10; G06F 21/121; G06F 21/6209; G06F 2221/2107; H04L 63/0428; H04L 63/08; G11B 20/00086; G11B 20/0021; H04N 7/1675

USPC ............. 726/30; 713/165, 168, 189; 380/201, 380/203, 228; 705/57, 59
See application file for complete search history.

(56) References Cited

U.S. PATENT DOCUMENTS

| 5,917,912 A | 6/1999 | Ginter |
|---|---|---|
| 2002/0013772 A1 | 1/2002 | Peinado |

(Continued)

FOREIGN PATENT DOCUMENTS

| JP | 2004-046833 | 2/2004 |
|---|---|---|
| JP | 2004-179941 | 6/2004 |

(Continued)

OTHER PUBLICATIONS

European Search Report of Apr. 18, 2013.
Japanese Office Action of May 6, 2013 for counterpart JP application No. 2012-500725 and English translation.

*Primary Examiner* — Aravind Moorthy
(74) *Attorney, Agent, or Firm* — Gottlieb, Rackman & Reisman PC

(57) ABSTRACT

A system and method of protecting digital media contents, which maintain compatibility with an existing system and block any attempt to illegally use the digital media contents having various formats, and which reduce a system load and maximize a possibility of reusing the digital media contents. The system includes a packager for analyzing a format of contents and encoding at least a portion of a data region located in a payload of the contents, and for generating encoded contents by inserting encoding information including at least one of an encoding key value and contents information into the contents; and a digital rights management (DRM) server for receiving a request for a license and the encoding information from an external device which receives the encoded contents, for confirming the encoding information and then generating a license which is used to decode the encoded contents, and for providing the generated license to the external device.

15 Claims, 13 Drawing Sheets

(51) Int. Cl.
    *H04L 9/32*     (2006.01)
    *G06F 12/14*     (2006.01)
    *H04N 7/167*     (2011.01)
    *G06F 21/00*     (2013.01)
    *G06F 21/10*     (2013.01)
    *G06F 21/12*     (2013.01)
    *G06F 21/62*     (2013.01)
    *G11B 20/00*     (2006.01)

(52) U.S. Cl.
    CPC ........ *G06F 21/6209* (2013.01); *H04L 63/0428* (2013.01); *H04N 7/1675* (2013.01); *G11B 20/0021* (2013.01); *G11B 20/00086* (2013.01); *G06F 2221/2107* (2013.01)
    USPC ............. 726/30; 713/165; 713/168; 713/189; 380/201; 380/203; 380/228; 705/57; 705/59

(56) References Cited

U.S. PATENT DOCUMENTS

2010/0250439 A1\*   9/2010   Park et al. ........................ 705/54
2011/0314245 A1\*  12/2011   Hanes et al. ................... 711/164

FOREIGN PATENT DOCUMENTS

| JP | 2007-335996 | 12/2007 |
|----|----|----|
| JP | 2003-174439 | 6/2013 |
| KR | 10-0400947 | 9/2003 |
| KR | 10-2005-0043289 | 5/2005 |
| KR | 10-2006-0015797 | 2/2006 |
| KR | 10-2008-0039150 | 5/2008 |
| KR | 10-2005-0055568 | 6/2011 |
| WO | WO 2008 108550 | 9/2008 |

\* cited by examiner

SYSTEM AND METHOD OF PROTECTING DIGITAL MEDIA CONTENTS

TECHNICAL FIELD

The present invention relates to a system and method of protecting digital media contents, and more particularly, to a system and method of protecting digital media contents, which maintain compatibility with an existing system, block any attempt to illegally use the digital media contents having various formats, reduce a system load, and maximize a possibility of reusing the digital media contents.

BACKGROUND ART

With the rapid increase in communication speed and spread of high capacity storage media and various portable multimedia reproducing apparatuses, demand for digital media contents has increased. Thus, various media contents providers have appeared and provide the media contents by using various methods. However, due to characteristics of the digital media contents, a copy, which is the same as the original digital media contents or is modified from the original digital media contents, may be easily made and also easily distributed through various routes. Thus, commercial damage to providers providing the digital media contents and producers making the digital media contents has rapidly and substantially increased.

As the distribution of digital media contents through the Internet has become common since a high speed communication network is widely distributed in general homes, formats of digital media files have been developed in various directions in order to provide, with a smaller capacity or a strengthened real time transmission function, media contents having higher quality. These formats of various digital media files have been developed to add various functions concerned with raising or maintaining quality of the digital media contents or strengthening a streaming function for real-time transmission according to Internet transmission characteristics. Even in the case of a format having no regard for the streaming function, a technology for transmitting the format in a streaming method has been accomplished and thus most of the currently used digital media contents may be streamed through a streaming system.

Streaming of the digital media contents is widely used as a way to protect the digital media contents because the streaming of the digital media contents has not only a real time characteristic in which reproduction is started together with contents selection but also a contents security characteristic depending on a method of reproducing the contents while storing the contents in a memory by dispersing and transmitting the contents in units of packets and then of deleting contents whose reproduction is completed, from the memory.

FIG. 1 illustrates a configuration of a streaming system providing general digital media contents by using the streaming method. As illustrated, the streaming system includes a contents server 1 including contents, a streaming server 3 which is connected to the contents server 1 through a LAN network 2, requests the contents server 1 to send the contents, and transmits received contents in units of packets, and a user terminal 5 which is connected to the streaming server 3 through Internet 4, requests the streaming server 3 for the contents, and reproduces the contents received in units of packets.

An operation of the system is described below.

First, if the user terminal 5 requests desired contents by accessing the streaming server 3 through Internet 4, the streaming server 3 receives the contents from the contents server 1 by requesting the contents server 1 to send the contents, and then provides received contents to the user terminal 5 in units of packets. The user terminal 5 reproduces the contents streamed in units of packets through an internal reproducing unit 6, and then a packet, reproduction of which is completed, is deleted.

Since this streaming server 3 provides a streaming service while being connected to a plurality of user terminals, session information, such as a packet size depending on connected ports when contents are being provided and a communication status, is constantly changing. In addition, although the streaming server 3 may have a security characteristic, in that packet information is deleted after reproduction of the packet information is completed, it is difficult to ensure security through an existing streaming system such as the streaming system of FIG. 1, because a received packet may be stored, in a file form, in a network terminal or the user terminal 5 and, in some cases, a contents file may be directly accessed by determining the contents location in the contents server 1.

A server using a digital rights management (DRM) technology has been developed to protect the digital media contents. However, in the case of using a basic method in which the digital media contents may be reduced by encoding all of the digital media contents and decoding the encoded digital media contents through a specific license, it is difficult to apply the streaming service to the basic method, and reproduction has to be performed after receiving total contents having a large capacity and then decoding the total contents.

Meanwhile, in the case of applying a packager for contents packet encoding to a back end of the streaming server, an existing system may be used. However, in this case, speed is slow because an encoding process is included in a streaming process, a possibility of original contents being leaked still exists, and, in addition, a streaming function may not be smoothly performed.

In order to partially solve this problem, in Korean Patent Application No. 2010-0596382, entitled "Apparatus for Protecting Digital Content and Method Therefor", a technology, in which a streaming service is implemented through an existing streaming server, has been provided. In this technology, the streaming service provided through an existing streaming server is made possible by maintaining a format of a MP4 file, with disposing a packager between a contents server and a streaming server and thus selectively encoding only video and audio data streams of the MP4 file. This technology is described below with reference to FIG. 2.

FIG. 2 illustrates an example of a configuration of a streaming system for streaming MP4 digital media contents while protecting the digital media contents. The streaming system of FIG. 2 includes a streaming server 13 and a user terminal 15, which have the same functions as those of the existing art, a packager 11, which is disposed between a contents server 10 and the streaming server 13, for encoding the digital media contents to use the DRM technology, a user terminal 15 of which a reproducing unit 16 includes a DRM filter 17 for securing a DRM license and decoding by using the DRM license, and a DRM server 20 for generating a license depending on packaging information of the packager 11.

In the streaming system, as illustrated in FIG. 2, if the contents server 10 provides contents requested by the streaming server 13, the packager 11 packages the contents by considering a set-up of a session between the user terminal 15 and the streaming server 13 and then provides packaged contents to the streaming server 13. Here, the packager 11 provides packaging information to the DRM server 20. The streaming server 13 performs streaming by using encoded contents which are generated by compressing, for example, only a key-frame of a video signal or more data including the key-frame. The reproducing unit 16 of the user terminal 15 receives a streamed encoded packet, namely the encoded contents, and the DRM filter 17 of the reproducing unit 16 requests the DRM server 20 to send a license, based on session information which is currently being accessed and described in session description protocol (SDP) format information including information about an environment for communicating with the streaming server 13 (namely, communication port information) and contents information (namely, contents identifier). The DRM server 20 retrieves packaging information stored in the packaging information storing unit 21 with the session information, and, if there is corresponding information, a license generating unit 22 generates a license and then provides the license to the DRM filter 17. The DRM filter 17, which obtains the license from the license generating unit 22, decodes a received packet, and the reproducing unit 17 reproduces a decoded packet. The received packet is deleted after a reproduction is finished.

That is, the streaming system illustrated in FIG. 2 newly performs packaging for only a currently connected terminal during a streaming service, stores information, which is related to encoding applied to corresponding packaging, in the DRM server 20 based on the current session information. In addition, if the DRM filter 17 receiving the encoded packet requests the DRM server 20 to send a license based on the current session information, the DRM server 20 searches for encoding-related information stored based on the current session information and then issues a corresponding license.

In the streaming system of FIG. 2, if the encoded packet is stored in a separate file 18, a corresponding file is not normally reproduced because at least a portion of a data part is encoded. Meanwhile, because the obtained license depends on one-time information such as a communication session of the streaming server 13 and the user terminal 15, it is impossible to obtain again license information after a session connection is ended, and thus it is impossible to reuse the obtained license.

Although the streaming system illustrated in FIG. 2 may use an existing streaming server, reduce an encoding time, and raise security by managing a license based on the one-time information, in the streaming system of FIG. 2, only a single format may be used due to the fact that encoding should be performed all the time for every connected user, a portion of the contents may be obtained because encoded information may be restrictively used to reduce load, and there exists a serious security problem in which illegal access that could enable downloading of the contents by obtaining addresses of the contents stored in the contents server 10 is not blocked. In addition, in the streaming system of FIG. 2, because it is necessary to newly encode contents and then transmit whenever a user terminal requests the streaming server to send the contents, the number of users capable of being simultaneously connected is limited. In addition, because it is impossible to reuse the digital media data received through a large amount of time and network traffic, all processes should be repeated from the first if the user wants to view the same contents again. Also, it is impossible to reproduce and reuse the contents by moving received contents to a portable multimedia reproducing apparatus or transmitting the received contents to another person and then additionally obtaining only a license.

Accordingly, new technology for protecting contents, which may be applied to various contents formats and also maintain compatibility with an existing contents distribution system, which may maximize security without reducing the number of simultaneously connected users or increasing a separate service providing system load, and which may reuse the contents by re-obtaining only a license after transmitting encoded contents to another person or moving the encoded contents to another apparatus while making it possible to reuse received contents, is required.

DETAILED DESCRIPTION OF THE INVENTION

Technical Problem

The present invention provides a system and method of protecting digital media contents, which encode at least a portion of media data of a payload of each of digital media contents files having various formats and maintain a format of the digital media contents by inserting encoding information into an information region, which may be added to a front end of an encoded payload or changed, of the digital media contents, and which prevent an increase in a system load while maintaining compatibility with an existing system and block leaking of contents due to contents server hacking.

The present invention also provides a system and method of protecting digital media contents, which prevent an increase in a load due to application of digital rights management (DRM) and a decrease in the number of users simultaneously connecting, by streaming contents encoded in the same manner for the same contents, and which reproduce received contents and reuse received encoded contents by using a license provided from an independent DRM server.

The present invention also provides a system and method of protecting digital media contents, which reproduce received streaming contents, which are transmitted from another terminal, by receiving only a license from the DRM server and thus ensure legal use depending on reuse of the received streaming contents.

The present invention also provides a system and method of protecting digital media contents, which provide a consistent packaging method which allows the DRM to be applied by effectively encoding only data while maintaining a container which is a data structure containing video data, audio data, and meta data for various formats such as an audio video interleave (AVI), a moving picture experts group 2-transport stream (MPEG2-TS), a flash video (FLV/FLA), and a window media audio(WMA)/window media video(WMV)/advanced system format(ASF), and which are widely used and are expandable.

The present invention also provides a system and method of protecting digital media contents, which support various service providing methods including downloading and progressive downloading as well as streaming by maintaining containers of various formats of digital media contents through payload encoding and encoding information insertion and then allowing a packager to obtain a license from an independent DRM server by using the inserted encoding information, and which use downloaded contents by using an existing or reissued license regardless of whether a reproducing apparatus is on-line or off-line and the number or kinds of reproducing apparatuses.

Technical Solution

To solve the above technical problem, there is provided a digital media contents protecting system including: a packager for analyzing a format of contents and encoding at least a portion of data region located in a payload of the contents files and for generating encoded contents by inserting encoding information including at least one of an encoding key value and contents information into the contents; and a digital rights management (DRM) server for receiving a request for a license and the encoding information from an external device which receives the encoded contents, for confirming the encoding information and then generating a license which is used to decode the encoded contents, and for providing the generated license to the external device.

To solve the above technical problem, there is provided a method of protecting digital media contents, the method including: receiving contents from a packager; analyzing a format of the received contents and encoding at least a portion of data of a payload; inserting encoding information used in the process of encoding the data into the contents; providing encoded contents including the encoded data and the encoding information to an external device; receiving, by a digital rights management (DRM) server, a request for a license from the external device; and receiving the encoding information from the external device, confirming the received encoding information and then generating a license, and providing the generated license to the external device.

Advantageous Effects

A system and method of protecting digital media contents according to the present invention encode at least a portion of media data of a payload of each of digital media contents files having various formats and maintain a format of the digital media contents by inserting encoding information into an information region, which may be added to a front end of an encoded payload or may be changed, of the digital media contents, and prevent an increase in a system load while maintaining compatibility with an existing system and block leaking of contents due to contents server hacking.

In addition, a system and method of protecting digital media contents according to the present invention prevent an increase in a load due to application of digital rights management (DRM) and a decrease in the number of users simultaneously connecting, by streaming contents encoded in the same manner for the same contents, and reproduce received contents and reuse received encoded contents by using a license provided from an independent DRM server.

In addition, a system and method of protecting digital media contents according to the present invention reproduce received streaming contents, which are transmitted from another terminal, by receiving only a license from the DRM server and thus ensure legal use depending on reuse of the received streaming contents.

In addition, a system and method of protecting digital media contents according to the present invention provide a consistent packaging method which allows the DRM to be applied by effectively encoding only data while maintaining a container for various formats such as an audio video interleave (AVI), a moving picture experts group 2-transport stream (MPEG2-TS), a flash video (FLV/FLA), and a window media audio(WMA)/window media video(WMV)/advanced system format(ASF), and are widely used and are expandable.

In addition, a system and method of protecting digital media contents according to the present invention support various service providing methods including downloading and a progressive download as well as a streaming by maintaining containers of various formats of digital media contents through payload encoding and encoding information insertion and then allowing a packager to obtain a license from an independent DRM server by using the inserted encoding information, and use downloaded contents by using an existing or reissued license regardless of whether a reproducing apparatus is on-line or off-line and the number or kinds of reproducing apparatuses.

BEST MODE

Figure 1:
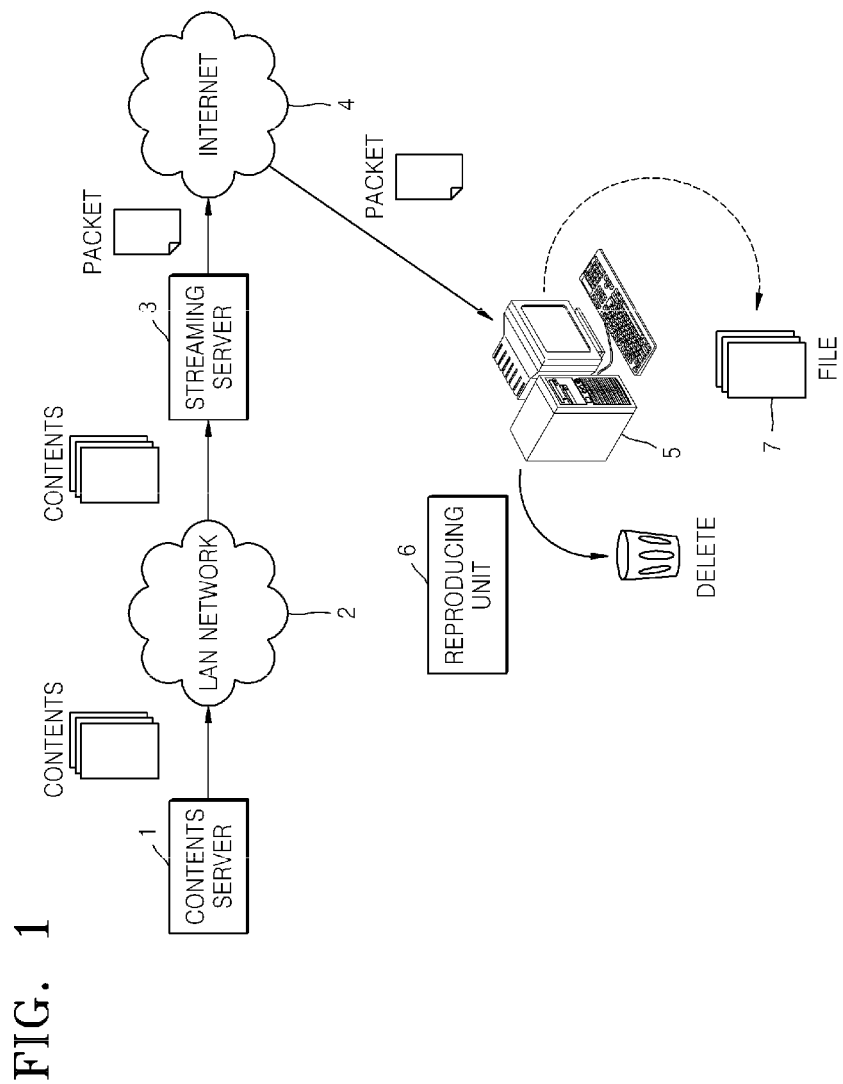
FIG. 1 illustrates a configuration of a general streaming system.
Figure 2:
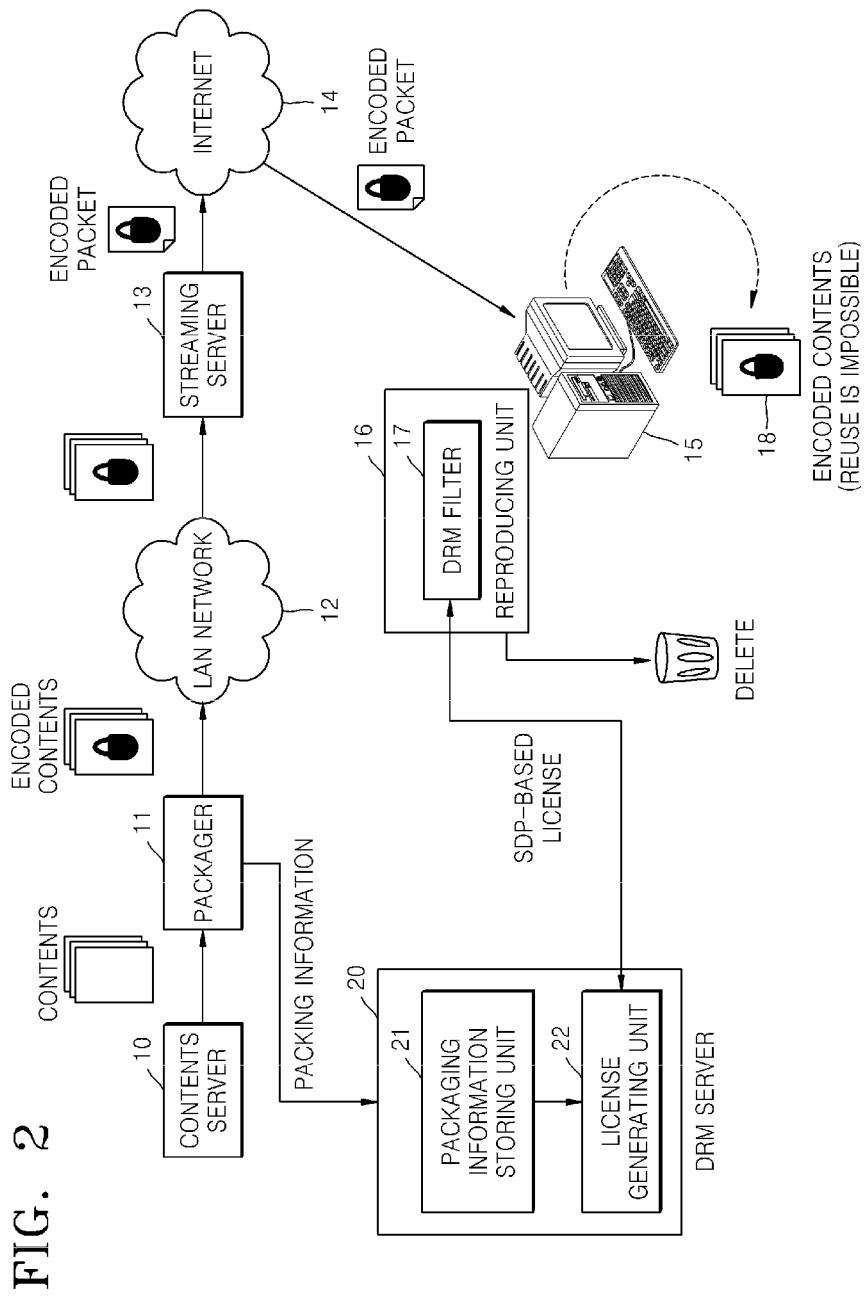
FIG. 2 illustrates a configuration of a streaming system to which a conventional digital rights management (DRM) technology is applied.

According to an aspect of the present invention, there is provided a digital media contents protecting system including: a packager for analyzing a format of contents and encoding at least a portion of a data region located in a payload of the contents, and for generating encoded contents by inserting encoding information including at least one of an encoding key value and contents information into the contents; and a digital rights management (DRM) server for receiving a request for a license and the encoding information from an external device which receives the encoded contents, for confirming the encoding information and then generating a license which is used to decode the encoded contents, and for providing the generated license to the external device.

According to another aspect of the present invention, there is provided a digital media contents protecting system including: a packager for analyzing a format of contents and performing a first encoding operation for at least a portion of a data region located in a payload of the contents, for generating encoding information by performing a second encoding operation on information including at least one of an encoding key value and contents information, which are used in the first encoding operation, and for generating encoded contents by inserting the generated encoding information into an information region, which is added to the contents or is changed, of the contents; and a contents server, which is disposed in a back end of the packager, for receiving the encoded contents from the packager and then storing the encoded contents, and for providing the stored encoded contents in response to an external request.

According to another aspect of the present invention, there is provided a digital media contents protecting system including: a packager for analyzing a format of contents and encoding at least a portion of a data region located in a payload of the contents, and for generating encoded contents by inserting encoding information including at least one of an encoding key value and contents information into the contents; a digital rights management (DRM) server for receiving a request for a license and the encoding information from an external device which receives the encoded contents, for confirming the encoding information and then generating a license which is used to decode the encoded contents, and for providing the generated license to the external device; and a DRM filter for extracting the encoding information from the encoded contents and providing the extracted encoding information to the DRM server, and for receiving the license from the DRM server and then decoding the encoded contents, to reproduce the encoded contents generated in the packager.

According to another aspect of the present invention, there is provided a method of protecting digital media contents, the method including: receiving contents from a packager; analyzing a format of the received contents and encoding at least a portion of data of a payload; inserting encoding information used in the process of encoding the data into the contents; providing encoded contents including the encoded data and the encoding information to an external device; receiving, by a digital rights management (DRM) server, a request for a license from the external device; and receiving the encoding information from the external device, confirming the received encoding information and then generating a license, and providing the generated license to the external device.

MODE OF THE INVENTION

The attached drawings for illustrating exemplary embodiments of the inventive concept are referred to in order to gain a sufficient understanding of the inventive concept and the merits thereof accomplished by the implementation of the inventive concept.

Hereinafter, the inventive concept will be described in detail by explaining exemplary embodiments thereof with reference to the attached drawings. Like reference numerals in the drawings denote like elements.

Figure 3:
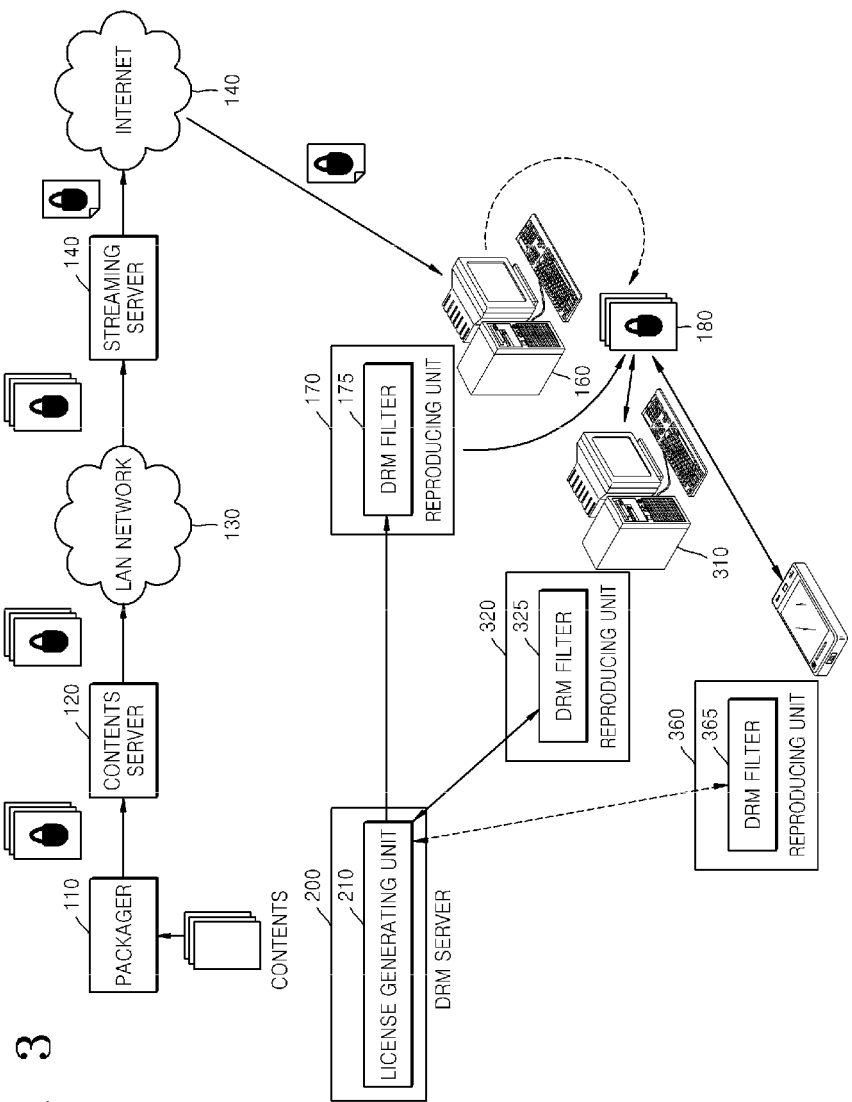
FIG. 3 illustrates a configuration of a streaming system according to an embodiment of the present invention.

FIG. 3 illustrates a configuration of a streaming system of digital media contents (below, referred to as "contents" for convenience of description) according to an embodiment of the present invention. Although the configuration illustrated in FIG. 3 is a streaming system, the present invention is not limited to a a particular contents distribution system and the present invention may be applied to various kinds of systems including a contents download system and a contents progressive download system (a function of the contents progressive download system may be provided also by the streaming system).

First, referring to FIG. 3, the streaming system includes a contents server 120, a streaming server 140 connected to the contents server 120 through a local area network (LAN) 130, and a user terminal 160 connected to the streaming server 140 through Internet 150.

In order to protect the contents, the streaming system of FIG. 3 further includes a packager 110 which is connected to a front end of the contents server 120 and encodes the contents, a DRM filter 175 which is integrated with or additionally installed in a reproducing unit 170 included in a user terminal 160 receiving a contents packet provided through the streaming server 140 and decodes contents encoded in the packager 110, and a DRM server 200 which generates and issues a license based on information of specific encoded contents.

The packager 110, in the case of encoding the contents, does not encode all contents but selectively encodes a payload of the contents, in which data such as audio data or video data is located, depending on a format of corresponding contents, and thus, various pieces of information depending on the format of the contents are maintained intact. That is, streaming or reproducing is possible by maintaining various functions of a multimedia file format intact, but video data and audio data provided actually are encoded so as not to be exactly revealed. This is because, in various file formats, size information of the payload is included in a container, and a size of the encoded data may be the same as that of original data. For this, an encoding method, in which padding is not generated, may be used.

The packager 110 inserts an encoding key applied to encode the payload part and information including identification information of the contents, as encoding information, into corresponding contents while maintaining the container of the contents, and, here, corresponding information may be encoded to strengthen security. Here, a method which may be used for decoding in the DRM server 200 may be used as an encoding method, and a key which may be decoded in the DRM server 200 may be used as an encoding key. The encoding method and the encoding key may be different from those used to encode the data of the payload. If necessary, location information of the DRM server may be also included in the encoding information.

In order to insert the encoding information into the corresponding contents while maintaining the container, an information region, which is included in most container configurations having a multimedia file format, is used, and the encoding information may be inserted into a region, which may be added to the information region or may be changed, of the information region.

In this manner, only data is internally encoded while maintaining the container through the packager 110, and, in the case where the encoding information is inserted, corresponding encoded contents may become independent contents to be distributed. The corresponding contents are reproduced, but have a low risk of being leaked because normal contents are not provided. The encoded contents are stored in the contents server 120, are provided to the streaming server 140 depending on a request of the streaming server 140, and then are provided to the user terminal 160 in units of packets. Here, session information between the streaming server 140 and the user terminal 160 may be changed depending on a network environment, but only a packet size and the like are changed and substantial content of the encoded contents, which is provided, is not changed.

The reproducing unit 170, which is included in the user terminal 160, may include the DRM filter 175 which is integrated with or separately installed by downloading in the reproducing unit 170. The DRM filter 175 may be installed using a method similar to a method of additionally installing a coder-decoder (CODEC) to support a specific file format, and performs an operation of decoding the encoded contents.

The DRM filter 175 extracts encoding information included in corresponding contents in the case of receiving encoded contents, and transmits the encoding information to the DRM server 200 after accessing the DRM server 200 by using a location, which is previously set or inserted in the encoding information, of the DRM server 200. The DRM server 200 decodes the encoding information and then confirms key information and a contents identifier included in the information. A license generator 210 of the DRM server 200 generates a license which includes the key information and DRM policy information, which may be used to decode encoded payload data of the contents according to a DRM policy (for example, cost of the contents, the number of reproductions, a period of use, or a terminal certification), and transmits a generated license to the DRM filter 175. The DRM filter 175, which obtains the license from the DRM server 200, decodes the encoded contents by using a key included in the license so that the reproducing unit 170 may reproduce corresponding contents.

In general, although a streamed packet may be deleted, a packet which is received may be sequentially stored as an encoded contents file 180 by a setting of the DRM filter 175 or through a separate means. In the case of a file download method or a progressive download method, the encoded contents file 180 is saved.

The license information may be stored in the DRM filter 175 and, if necessary, may be stored in the DRM filter 175 in a duplicable form and thus exposed to the user. If license information for corresponding contents exists, the DRM filter 175 may perform decoding by using the license information. This means that, in the case where the user wants to see the same contents again, it is possible to reproduce the encoded contents file 180 previously received and saved, through a previously obtained license without starting streaming from the beginning again.

In the case where use of the license is limited to the user terminal 160 or the DRM filter 175, it is impossible to reproduce the encoded contents file 180 when transmitting or copying the encoded contents file 180 to another terminal 310. However, in this case, the DRM filter 325, which is located in the reproducing unit 320 of a corresponding terminal, may operate and thus obtain a license again by accessing the DRM server 200, and thus it is possible to reuse corresponding contents through only a license obtaining process without having to receive the corresponding contents again.

When copying the encoded contents 180 to a terminal 360 which is impossible to directly communicate with the DRM server 200 and then reproducing copied contents, a terminal which is capable of communicating with the DRM server 200, for example, a user terminal 160, is connected to the DRM server 200, directly or through the DRM filter 175. Thus, the user terminal 160 is not limited to a reproducing means, but obtains a license in which the number of times it may be used or a use period is limited, copies the license to the terminal 360 which is incapable of directly communicating with the DRM server 200, and thus, it is possible to reproduce an encoded contents which reflects a predetermined DRM policy. If the terminal 360, which is incapable of directly communicating with the DRM server 200, may be connected to the user terminal 160, it is possible to obtain a license after registering the terminal 360 to the DRM server 200 through this connection. The present invention is not limited thereto because a license issue policy or the DRM policy may be comprehensively applied to various DRM methods.

It will be understood by those of ordinary skill in the art that the current embodiment of the present invention is just an example for explaining a reuse possibility of encoded contents which may be reproduced with a legal method by freely copying the encoded contents 180 to various terminals.

Reusing the encoded contents 180 while maintaining contents security is possible due to a configuration, in which encoding information is inserted in the contents when encoding in the packager 110 and a license may be obtained from the DRM server 200 by using only encoded contents information. Thus, independent characteristics of the packager 110, the DRM server 200, and the DRM filters 175, 325, and 365 are guaranteed, and thus, these components are easy to control.

Accordingly, security is high because a possibility of the contents being leaked is very low even if a file location of the contents server 120 is hacked, a load of a system which distributes the contents is not increased because the encoded contents are repeatedly used, and thus, the number of users simultaneously connecting is not decreased. In addition, the dissipation of network resources for re-watching the contents may be prevented because it is possible to receive and then variously reuse the encoded contents, it is possible to effectively satisfy users who demand contents to be reproduced through various potable multimedia reproducer, and, in addition, it is possible to increase the number of times contents may be used through the off-line spread of contents by using various high capacity storage means. That is, in the case of commercially providing the contents, consumption of the contents may be largely increased because the providing the contents is not limited to directly connecting with an on-line system.

An embodiment, which encodes the payload part depending on the format of the contents and performs encoding on the contents so as not to change the container while including encoding information in an information region, will now be explained with reference to a plurality of formats.

Figure 4:
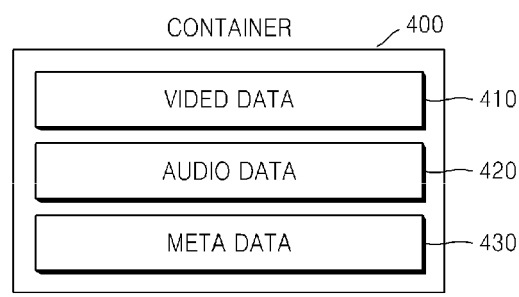
FIG. 4 is a conceptual diagram illustrating a structure of a container of a multimedia file format.

FIG. 4 illustrates a configuration of a general multimedia file. As illustrated in FIG. 4, contents corresponding to data parts such as video data 410, audio data 420, and meta data 430 are included in a container 400. Almost all the multimedia file formats includes information about a change of a reproduction location and various reproduction environments, information for easily processing a data stream, information which is related to various technologies applied to reduce the amount of data, and information for supporting diversity of file transmission. These various pieces of information are set in the data parts and variously changed by a kind of a used CODEC and an encoding environment, and thus, physical location of the various information are not formalized. If some of the various information of the container 400 is arbitrarily changed, it is impossible to reproduce the contents even though there is no damage to the video data 410, the audio data 420, and the meta data 430.

Figure 5:
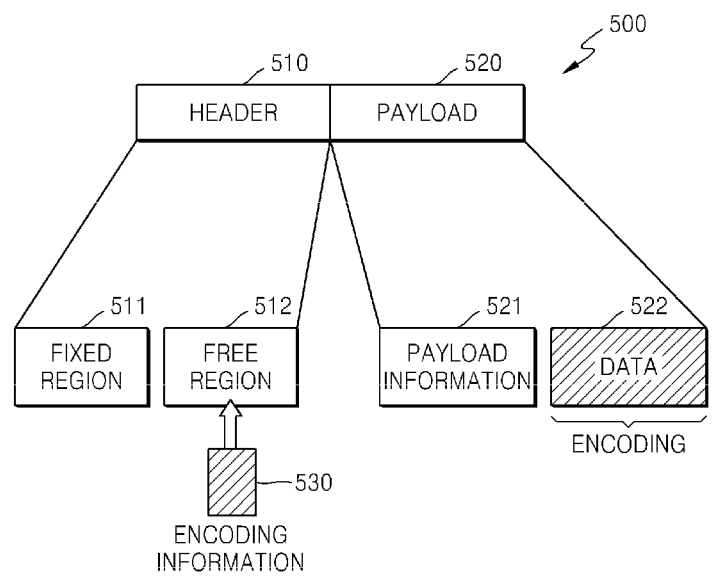
FIG. 5 is a conceptual diagram illustrating a method of encoding digital media contents according to an embodiment of the present invention.

FIG. 5 illustrates a general packet structure used in various multimedia formats, to explain a method used by the packager to encode contents, according to an embodiment of the present invention.

The contents may be divided into a plurality of regions, and each region 500 may be divided into a header region 510 and a payload region 520. The header region 510 may include information about a size or configuration of the payload region, and thus, it may be impossible to reproduce the contents in the case of arbitrary changing of the header region 510. In addition, it may be impossible to reproduce the contents also in the case of changing of the payload region 520, and this is because the payload region 520 also is divided into a payload information region 521 in which payload information is stored and a data region 522 in which data is stored.

Accordingly, the packager according to an embodiment of the present invention selects only the data region 522 and then encodes the data region 522 without changing the size thereof. As illustrated in FIG. 5, all of the data region 522 may be encoded. However, only a portion of the data region 522 may be encoded if necessary.

For example, one of a plurality of symmetry keys previously prepared may be used as a key for encoding, and because information about the symmetry keys is included also in the DRM server, if the user has information about the encoding key, it is possible to provide a corresponding key for decoding to the user. However, the inventive concept is not limited thereto, and various other encoding methods may be used.

After generating information, which is necessary to obtain a license from the DRM server and includes the encoding key information and contents identifier information (this is necessary in the case where the DRM server performs an application of cost per contents, an application of a DRM policy, a cost calculation, or the like) and then encoding the information by using an encoding method in which the DRM server may decode information after encoding, encoding information is inserted into the packet, namely the region 500. Here, the header region 510 may include a fixed region 511 which may not be changed (here, it is impossible to reproduce the contents if the fixed region 511 is changed), and a free region 512 which may be changed or into which information may be inserted (that is, the free region 512 is a region into which information may be added by arbitrary defining). If the free region 512 does not exist in the header region 510, an information region, which may be changed or into which information may be inserted, may exist in the payload information region 521 of the payload region 520. If the encoding information is inserted into the information region, it is possible to reproduce the contents because the container is not affected although the information region is changed or new information is added into the information region, and it is possible to maintain compatibility with various existing servers for distributing contents.

In some cases, in the case where a size of a header is limited to a small size or a kind of the payload is classified, it is possible to insert the encoding information into the information region while maintaining the container, by using a method of adding a new information region to a front end of the contents (that is, defining a new region having an information payload) and then inserting the encoding information into the new information region.

As a result, in the case of the multimedia file format, it is possible to generate encoded contents maintaining independent characteristics, by selecting a portion, in which data is located, of a payload and then encoding data of a selected portion without changing a size of the data, and inserting encoding information into an information region while maintaining the container.

If necessary, location information, namely a uniform resource locator (URL) of the DRM server 200, may be included in the encoding information.

Figure 6:
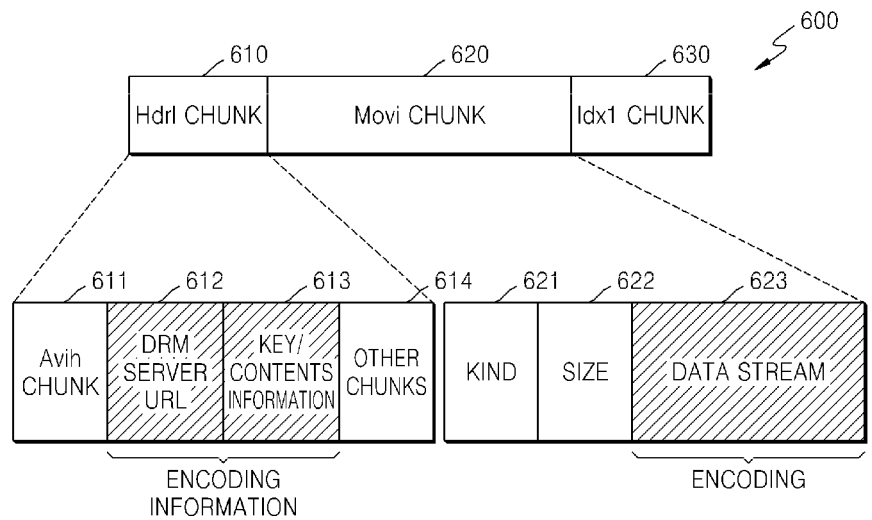
FIG. 6 illustrates a structure of an audio video interleave (AVI) file format.

FIG. 6 illustrates a structure of an audio video interleave (AVI) which is widely used. In general, the AVI takes a resource interchange file format RIFF (Resource Interchange File Format) and includes data blocks which are called chunks. Each chunk includes various information fields in each of which a classifier is located in a front end thereof. The AVI has been not designed in a format which considers streaming, but a solution capable of streaming the AVI has already been developed and used, and, in general, the solution is being provided by using a progressive download method, which may previously reproduce downloaded data during downloading, by using a hypertext transfer protocol (HTTP).

As illustrated in FIG. 6, a packet 600 includes a first chunk 601 (hereinafter referred to as "Hdrl chunk") including header information, a second chunk 620 (hereinafter referred to as "Movi chunk") including stream information and corresponding to the payload region, and a third chunk 630 (hereinafter referred to as "Idx1 chunk") including index information. Here, the Hdrl chunk 610 includes a fourth chunk 611 (hereinafter referred to as "Avih chunk") and other chunks 614 indicating a plurality of header information, and it is possible to define a new chunk and insert encoding information, namely information for the DRM, into the new chunk. In FIG. 6, a DRM server URL 612 and encoded key/contents identifier information 613 are inserted into the new chunk.

Meanwhile, the Movi chunk 620 is divided into a region 612 indicating a kind of the stream (a video stream, an audio stream, a text stream, or the like), a data stream region 623, and a region 622 in which a size of the data stream 623 is recorded. Accordingly, because it is difficult to normally reproduce contents in the case of encoding all the Movi chunk 620, only the data stream 623 is encoded without changing the size of the data stream 623 as the size recorded in the region 622.

Through this process, it is possible to encode the AVI contents while maintaining the container and to insert the encoding information into a chunk, depending on a general encoding rule explained with reference to FIG. 5.

Figure 7:
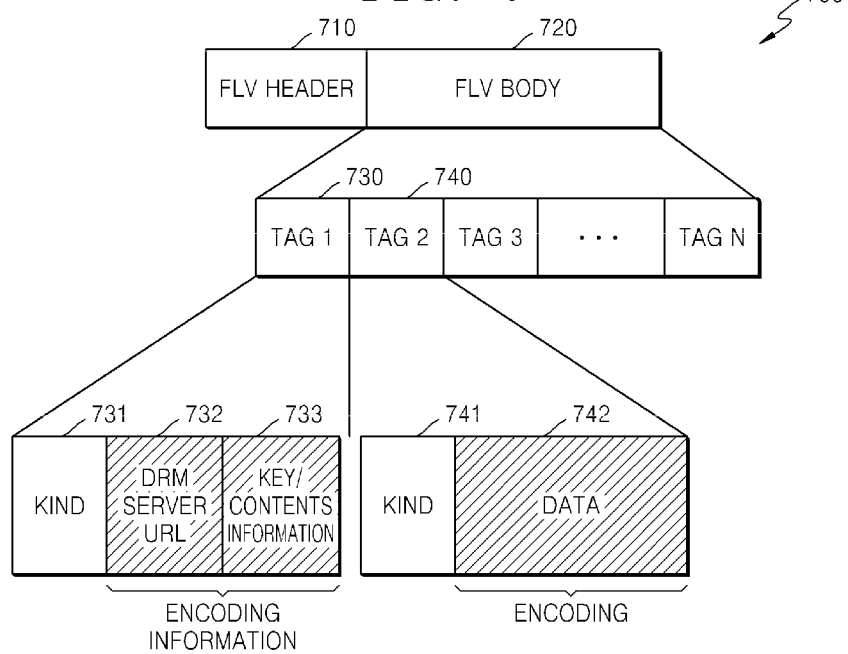
FIG. 7 illustrates a structure of a flash video (FLV/FLA) file format.

FIG. 7 illustrates a structure of a flash video (FLV/FLA) file format 700 which is a video stream form defined in flash media. This FLV format 700 is streamed through a flash media server or a HTTP server, and is generally provided by using a progressive download method. The FLV format 700 is divided into a FLV header region 710 and a FLV body region 720. The FLV header region 710, like most "Adobe" media formats, includes fixed information such as a file identifier and version information, and information indicating an existence or non-existence of a specific stream, and also an offset field for indicating a start position of the FLV body region 720. That is, the FLV header region 710 is not a header, but is similar to index information which includes only basic information and indicates only an offset position of data. Since the FLV header 710 does not include information such as a size of a total file or the number of tags TAG, which is included in the FLV body region 720, necessary tags may be added.

Accordingly, header information is located in tags of the FLV body region 720 together with streaming information.

The tags TAG 1 through TAG N of the FLV body region 720 are divided into a region 741 indicating a kind of a corresponding tag and a region 742 indicating data included in the corresponding tag. The FLV tag includes three kinds of tags, namely audio data, video data, and script data, and the tag 740 having the audio data and video data may perform payload encoding by selectively encoding only the data region 742 included in the tag 740.

It is possible to define a separate tag 730 and dispose the tag 730 at a front portion of a data tag to provide a key and contents information region 733, which includes information obtained by encoding information accompanied for encoding (key and contents identifier information), and a DRM server URL information region 732. A kind of the tag 730 may be determined by the script data, and annotations may be made to prevent rendering of the script data.

Through this process, it is possible to encode the FLV/FLA contents while maintaining the container and insert the encoding information into the FLV format 700, depending on a general encoding rule that was explained with reference to FIG. 5.

Figure 8:
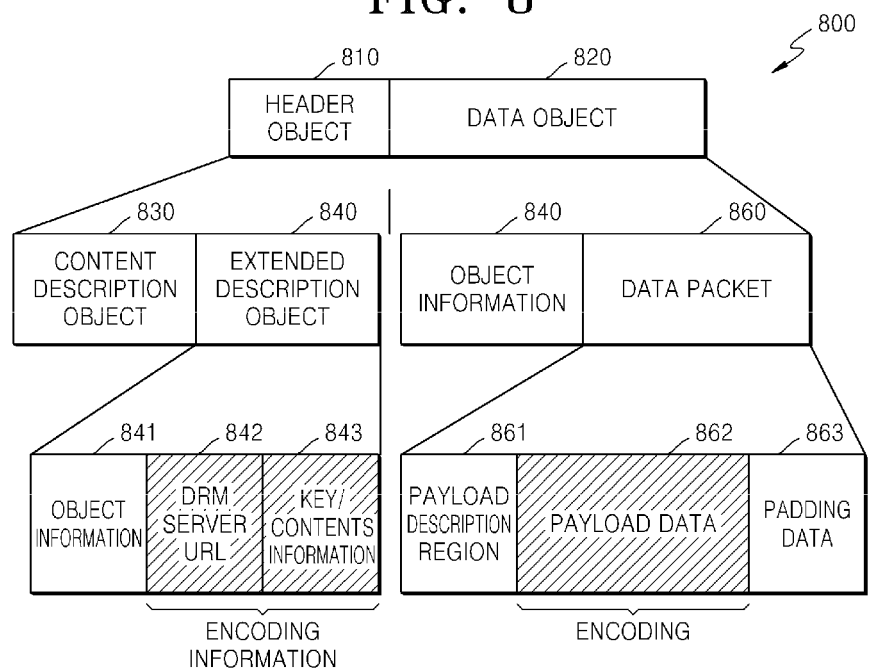
FIG. 8 illustrates a structure of a window media audio (WMA)/window media video (WMV)/advanced system format (ASF)

FIG. 8 illustrates a structure of a windows media (WMA/WMV/ASF) format. Substantially, the windows media audio (WMA) and the windows media video (WMV) have the same format as the advanced system format (ASF), and thus, only ASF is explained below.

The ASF consists of basic units which are called objects, and each object includes an identifier object GUID (global unique identifier), an object size, and object data, and a superordinate object includes a plurality of subordinate objects.

An ASF object 800, which is a superordinate object, includes a header object 810, a data object 820, and an index object (not shown) which is selectively used.

The header object 810 may include a plurality of objects which are divided by the GUID, and may basically include a content description object 830 and an extended description object 840. The content description object 830 is a fixed information region which is not changeable because the content description object 830 stores information such as a title, a producer, a copyright, and the like. However, because the extended description object 840 is a part which may be added by a writer to provide additional information which is not provided by the content description object 830, encoding information regions 842 and 843 may be inserted into the extended description object 840 by defining the regions 842 and 843 by using object information 841. Through this process, it is possible to insert encoding information into an information region located in a front end of a payload without changing a structure of the container related to a reproduction.

A payload portion of the ASF belongs to a data object 820, and the data object 820 is divided into a data object information region 850 and a data packet region 860. The data packet region 860 is divided into a payload description region 861, a payload data region 862, and a padding data region 863, and the payload data region 862, but not the payload description region 861, is encoded because the payload description region 861 includes important information for reproducing.

Through this process, it is possible to encode the ASF (WMA/WMV) contents while maintaining the container and insert the encoding information into the ASF (WMA/WMV), depending on a general encoding rule that was explained with reference to FIG. 5.

Figure 9:
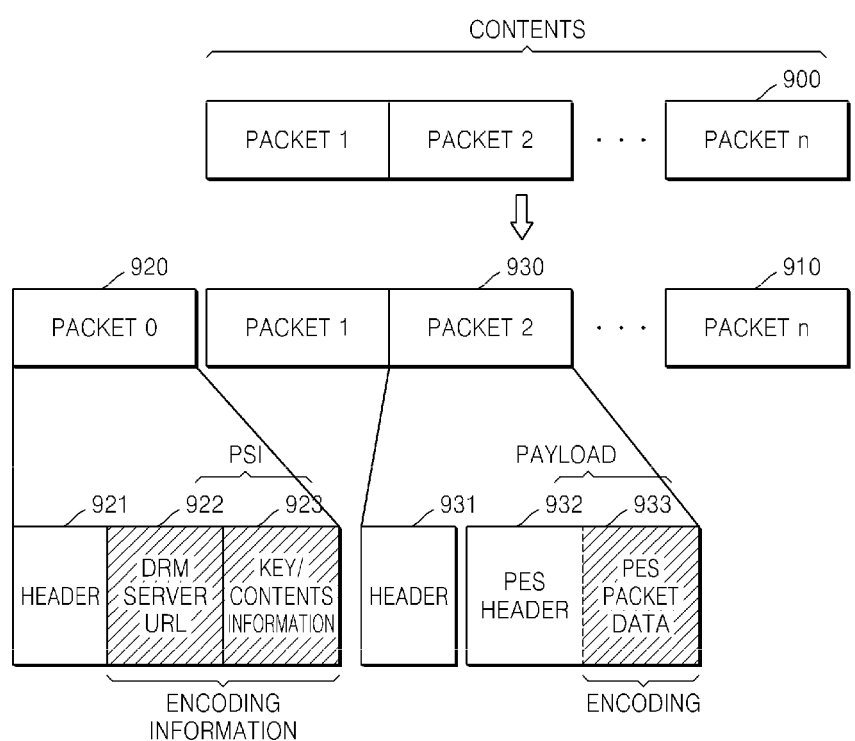
FIG. 9 illustrates a structure of a moving picture experts group 2 transport stream (MPEG-2 TS) file format.

FIG. 9 illustrates a structure of a moving picture experts group 2 (MPEG-2) file format, and, in detail, shows a structure of a MPEG-2 transport stream (TS). In the MPEG-2 TS, a single item of content 900 consists of 188 bytes of packets which are sequentially continuous to support streaming. These packets are divided into a packetized elementary stream (PES) packet 930 and a program specific information (PSI) packet 920, and the PES packet 930 includes an elementary stream (ES) having a header and video and audio information. The PSI packet 920 includes a header and a plurality of pieces of table information of which kinds are determined by a table identifier.

In detail, the PES packet 930, which includes contents data, is divided into a header 931 and an information region corresponding to the payload, and the information region is divided into a PES header region 932 and a PES packet data region 933. Here, only the PES packet data region 933 corresponding to video and audio stream data is encoded, and thus, it is possible to encode without changing a structure of the container.

The MPEG-2 TS is divided into a stream data packet and an information packet, and it is impossible to insert encoding information into a corresponding region because a size of a header of the stream data packet, namely the PES is fixed in a small size (for example, 4 bytes). However, because there is a limitation to the number of the packets, it is possible to insert encoding information into a corresponding region in a table form by adding the PSI packet 920 to a front end of an existing packet. That is, it is possible to include information indicating a PSI packet in a header 921 of the PSI packet 920, and to define encoding information regions 922 and 923 in a table information part by using a program after determining a kind of a table by using an identifier indicating a user private table which records program information depending on a personal purpose of a user.

Through this process, it is possible to encode the MPEG-2 contents while maintaining the container and insert the encoding information into the MPEG-2 contents, depending on a general encoding rule that was explained with reference to FIG. 5.

An embodiment of the present invention has been explained above by using 4 kinds of general multimedia file formats, i.e., the AVI, the FLV format, the ASF, and the MPEG-2 format. However, because other multimedia file formats also have a similar configuration to the 4 kinds of general multimedia file formats, if it is necessary to support each of the other multimedia file formats, it is possible to easily support each of the other multimedia file format by adding, in a module form, only a data extraction pattern and an encoding an information insertion pattern for supporting each of the other multimedia file formats to the contents server.

As stated above, as the packager according to an embodiment of the present invention operates, it is possible to determine a kind of a file format by analyzing the file format and to extract and encode data of a payload by using a searching method prepared per a determined file format. In addition, by inserting encoding information into a front end of the payload, it is possible to encode quickly compared to encoding all contents or re-encoding, and to prevent a change in a structure of the container to maintain compatibility. In addition, it is possible to provide encoding information with independent characteristics by inserting indispensable information for obtaining a DRM license into contents.

Figure 10:
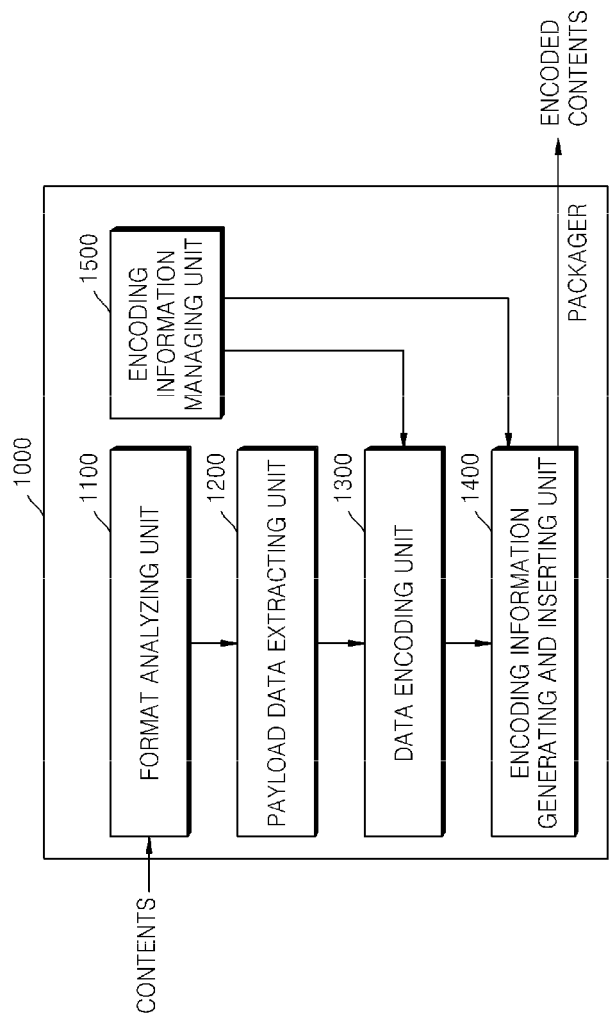
FIG. 10 is a block diagram illustrating an example of a configuration of a packager illustrated in FIG. 3.

FIG. 10 is a block diagram illustrating an example of a configuration of the packager illustrated in FIG. 3.

The packager 1000 may include a format analyzing unit 1100 for analyzing a format of original contents, a payload data extracting unit 1200 for dividing a payload region into parts depending on a kind of format analyzed by the format analyzing unit 1100 and for extracting a portion to be encoded from among a data region except for an information region in the payload region, and a data encoding unit 1300 for encoding the portion, which is extracted by the payload data extracting unit 1200, by using a predetermined key. The format analyzing unit 110 confirms a format of the original contents and determines whether or not to support an encoding operation for the contents depending on a confirmed format.

In addition, the packager 1000 may further include an encoding information generating and inserting unit 1400 for separately encoding information which includes key information about the key used for encoding and contents identification information and for generating encoding information, in which location information about a location of the DRM server is included in the encoded information, and then inserting the generated encoding information into an information region of the contents, and an encoding information managing unit 1500 for managing the key information to be used in the data encoding unit 1300 and the encoding information generating and inserting unit 1400.

An extraction operation of the payload data extracting unit 1200 and a generation and insertion operation of the encoding information generating and inserting unit 1400 may be sequentially performed, but may be also simultaneously performed since encoding information and contents identification information, which are to be used in the operations, are previously known.

A DRM identifier, which indicates that the contents have been encoded by a specific DRM version, instead of the location information about a location of the DRM server, may be included in the encoding information inserted by the encoding information generating and inserting unit 1400, or other information such as an innate identifier by which the DRM filter discriminates encoded contents may be included in the encoding information. In addition, the information such as the DRM identifier or the innate identifier may be further included in the encoding information, in addition to the location information about a location of the DRM server. In addition, in the case where the DRM filter knows the location of the DRM server, the location information about a location of the DRM server and/or the information such as the DRM identifier or the innate identifier may not be included in the encoding information.

The encoding information managing unit 1500 may include a plurality of pieces of other encoding information for encoding the payload, and may include one or more pieces of other encoding information for encoding the encoding information. For example, it is possible to use one of symmetry keys, which are commonly held together by the DRM server, to encode the payload, and it is possible to use an open key which may be decoded by using a secret key, which is held only by the DRM server, to encode the encoding information. Encoded contents generated by the above operation may be provided to a contents server (not shown) which is connected to the packager 1000. Although FIG. 10 illustrates the case where the encoding information generating and inserting unit 1400 generates the encoded contents and provides the encoded contents to the contents server, a contents transmitting unit (not shown) for providing the encoded contents to the contents server may be included in the packager 1000.

Figure 11:
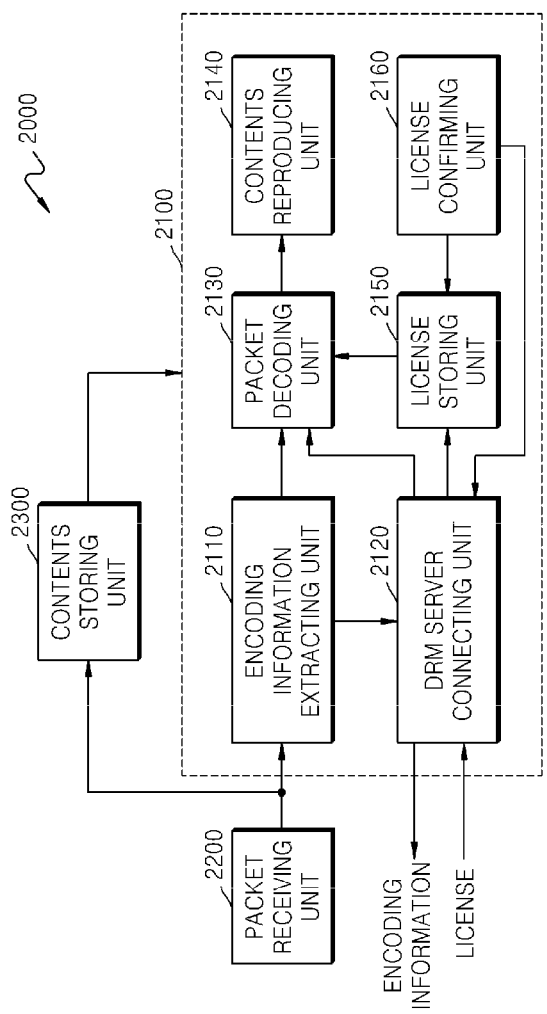
FIG. 11 is a block diagram illustrating an example of a configuration of a user terminal illustrated in FIG. 3.

FIG. 11 is a block diagram illustrating an example of a configuration of the user terminal illustrated in FIG. 3.

As illustrated in FIG. 11, the user terminal 2000 may include a DRM filter 2100, a packet receiving unit 2200, and a contents storing unit 2300. Although not illustrated in FIG. 11, the user terminal 2000 further includes a processor, for example, a central processing unit (CPU) for controlling an overall operation, including contents reproduction, of the user terminal 2000.

By using packet type encoded contents provided from the streaming server, the DRM filter 2100 extracts the encoding information included in the encoded contents, obtains a license from the DRM server (not shown) by using the extracted encoding information, and decodes and reproduces the encoded contents by using the obtained license. For this, as illustrated in FIG. 11, the DRM filter 2100 may include an encoding information extracting unit 2110, a DRM server connecting unit 2120, a packet decoding unit 2130, and a contents reproducing unit 2140. In addition, the DRM filter 2100 may further include a license storing unit 2150 and a license confirming unit 2160 to store and confirm the license provided from the DRM server. Although FIG. 11 illustrates the case where the DRM filter 2100 includes the contents reproducing unit 2140, the contents reproducing unit 2140 may be disposed outside of the DRM filter 2100. In this case, the DRM filter 2100 and the contents reproducing unit 2140 constitute the reproducing unit 170 of FIG. 3.

The packet type encoded contents, which is received through the packet receiving unit 2200, is transmitted to the encoding information extracting unit 2110. The encoding information extracting unit 2110 extracts the encoding information from a encoded packet, and provides the extracted encoding information to the DRM server connecting unit 2120. An address of the DRM server may be stored in the user terminal 2000, or may be included in the extracted encoding information. The DRM server connecting unit 2120 is connected to the DRM server with reference to the address of the DRM server, and provides the encoding information to the DRM server. If the license is received depending on a confirmation of the DRM server, the received license is provided to the packet decoding unit 2130. The packet decoding unit 2130 decodes received packet type encoded contents by using the license, and provides decoded contents to the contents reproducing unit 2140.

The received packet type encoded contents may be separately stored in the user terminal 2000, and the contents storing unit 2300 stores the encoded contents. In addition, the received license corresponding to the encoded contents is stored in the license storing unit 2150. Thereafter, in the case where the user terminal 2000 reproduces the encoded contents again, it is possible to use again the encoded contents stored in the contents storing unit 2300. In this case, it is possible to decode the encoded contents by using the license stored in the license storing unit 2150 without needing to obtain the license from the DRM server again. A plurality of encoded contents may be stored in the contents storing unit 2300, licenses for some of the encoded contents may be stored in the license storing unit 2150, and licenses for some of other encoded contents may not exist. The license confirming unit 2160 performs an operation of confirming whether there exists a license corresponding to encoded contents which are required to be currently reproduced. According to a confirmation result, the license is provided to the packet decoding unit 2130, and allows the packet decoding unit 2130 to perform a decoding operation on the encoded contents. If no corresponding license exists, the license confirming unit 2160 is connected to the DRM server connecting unit 2120 and controls the DRM server connecting unit 2120 so as to request the DRM server to send the corresponding license. In this case, the encoding information may be extracted from the encoded contents stored in the contents storing unit 2300, and extracted encoding information may be provided to the DRM server.

Figure 12:
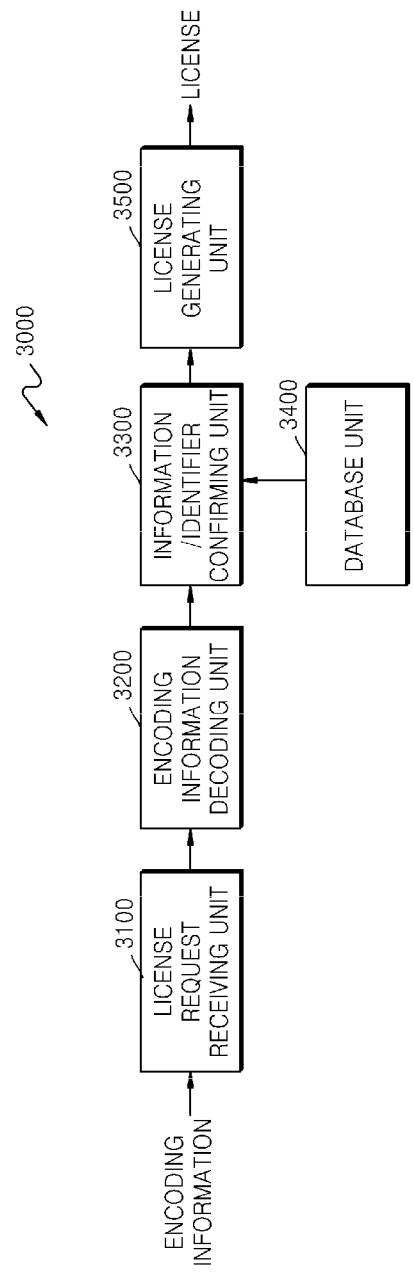
FIG. 12 is a block diagram illustrating an example of a configuration of a DRM server illustrated in FIG. 3.

FIG. 12 is a block diagram illustrating an example of a configuration of the DRM server illustrated in FIG. 3. As illustrated in FIG. 12, the DRM server 3000 may include a license request receiving unit 3100, an encoding information decoding unit 3200, an information/identifier confirming unit 3300, and a license generating unit 3500. In addition, the DRM server 3000 may further include a database unit 3400 for storing information about user terminals.

The license request receiving unit 3100 receives a license request and the encoding information from any one of the user terminals. The encoding information decoding unit 3200 decodes the received encoding information, and the information/identifier confirming unit 3300 confirms key information and a contents identifier which are included in the decoded information. An operation of confirming the key information and the contents identifier may be performed with reference to various pieces of information, which are stored in the database unit 3400 and are related to the user terminal. According to the confirmation result, in the case where a corresponding user terminal has a right to receive a license, the license generating unit 3500 generates a license depending on a DRM policy (for example, cost of the contents, the number of reproductions, a period of use, or a terminal certification) and provides the license to the corresponding user terminal.

Figure 13:
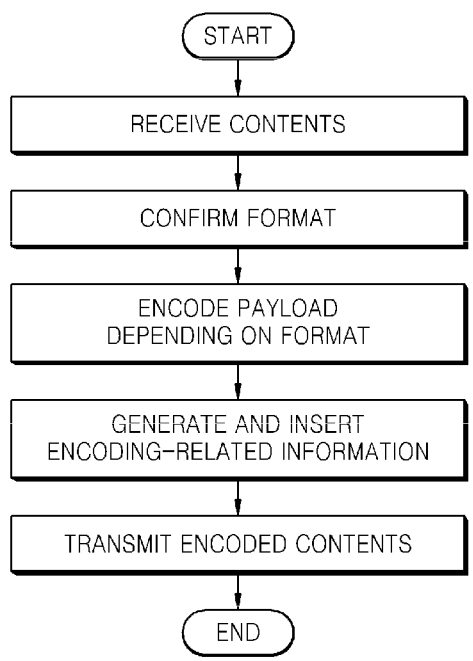
FIGS. 13 through 15 are flowcharts illustrating contents protecting processes according to an embodiment of the present invention.
Figure 14:
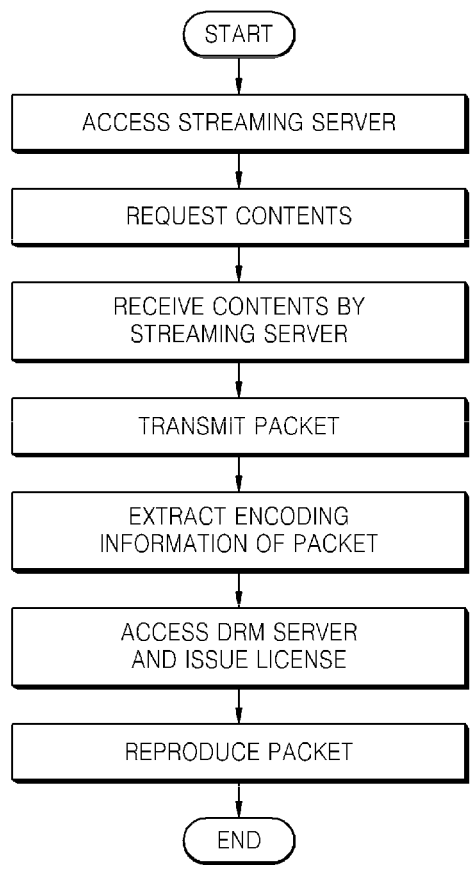
Figure 15:
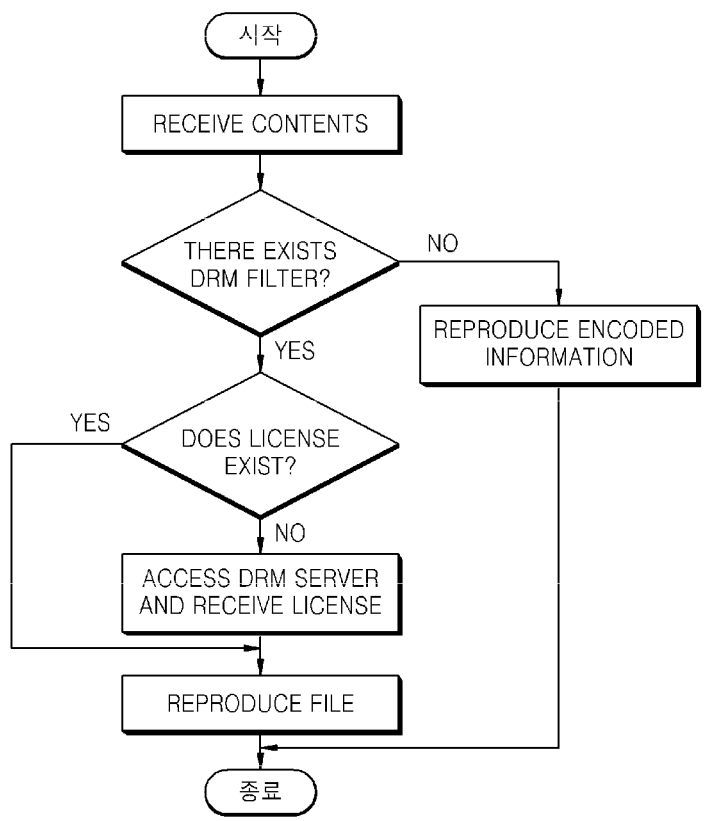

FIGS. 13 through 15 are flowcharts for explaining contents protecting processes according to an embodiment of the present invention. FIG. 13 is a flowchart illustrating sequences for encoding contents in a packager, FIG. 14 is a flowchart illustrating sequences for receiving encoded contents through a streaming system, and FIG. 15 is a flowchart illustrating sequences for reproducing received encoded contents or packets.

First, referring to FIG. 13, the packager receives original contents, determines whether or not to support the received original contents by confirming a format of the received original contents, and, in the case where the format of the received original contents is a supportable format, a data region of a payload depending on a kind of the format is extracted and then the data region of the payload is encoded without changing a size of the data region. After generating information (that is, information about a key, a contents identifier, and the like) related to the encoding simultaneously or sequentially while encoding the data region of the payload and then encoding the information related to the encoding in a separate method, encoding information is inserted into an information region of the contents.

Through this process, encoded contents, in which a container is maintained, are generated and transmitted to a contents server which actually distributes the contents.

FIG. 14 is a flowchart illustrating a process of distributing contents encoded in the packager of the streaming system. As illustrated in FIG. 14, a user accesses a streaming server through a user terminal, and requests the streaming server to send desired contents. Thus, the streaming server receives encoded contents corresponding to the request of the user from a contents server.

The streaming server provides the encoded contents in units of packets to the user terminal to which it is currently connected, and the user terminal receives an encoded packet, namely the encoded contents and transmits the encoded packet to a reproducing unit which is included in the user terminal.

A DRM filter which is included in the reproducing unit or is connected to the reproducing unit, extracts encoding information from the encoded packet and provides the encoding information to the DRM server. The DRM server issues a license including DRM policy information, which is set for key information for decoding and corresponding contents, and provides the license to the DRM filter.

The DRM filter decodes the encoded packet by using the license and provides a decoded result to the reproducing unit, and thus, the contents may be reproduced.

In this case, received encoded packets may be accumulated and then stored as the encoded contents. The DRM filter may store a received license and thereafter allow the stored license to be locally used in the case of the same contents, or may separately manage the received license as a file.

FIG. 15 is a flowchart illustrating a process of decoding and reproducing encoded contents. As illustrated in FIG. 15, in the case of receiving an encoded contents file and then reproducing the encoded contents file, if there is no DRM filter, it is impossible to provide normal contents to the user even though reproduction is possible because a container of the encoded contents file is maintained.

Thus, it is possible to provide a corresponding function to a reproducing unit by additionally installing the DRM filter in the reproducing unit, and a method of installing the DRM filter in the reproducing unit is similar to a method of installing a general CODEC. The DRM filter may be provided depending on the kinds of various terminals and the kind of reproducing unit, in a contents server which distributes the contents.

If the DRM filter is connected to the reproducing unit, it is possible to confirm an existence or non-existence of the license. If a corresponding license exists, it is possible to perform decoding and reproducing by using the corresponding license. However, if a corresponding license does not exist or the right to use the corresponding license is finished or limited, it is possible to perform decoding and reproducing by using a new corresponding license which is obtained by extracting encoding information from the encoded contents file, transmitting the encoding information to the DRM server, and then receiving the new corresponding license from the DRM server.

Various methods may be used to use a locally stored license. For example, a method in which a DRM filter records whether or not to use a license for a specific contents file and refers to the record, a method which matches specific information of the encoded contents file to license information, a method which inserts an inherent identifier for confirming a DRM license into the encoded contents file in an uncoded form or an encoding information form that the DRM filter may decode, or other various methods may be used to use the locally stored license.

Contents to be registered in a contents distribution system may be encoded through a packager which may define a detail encoding method for an individual file format depending on a consistent encoding rule and expand the encoding method if necessary. In addition, a license may be issued by communication between the DRM filter and the DRM server in various environments, in which the encoded contents are used, such as distributing the encoded contents through the contents distribution system, transmitting the encoded contents to other terminals, and copying the encoded contents to the other terminals. Thus, security may be greatly enhanced, a change in the contents distribution system may be minimized, and an application target and practical use of the encoded contents may be greatly increased. In particular, multimedia contents, which are downloaded to a personal computer (PC) through the Internet, may be reproduced in the PC, other terminals may receive the contents from the PC and reproduce the contents after obtaining only a license, and the contents may be copied to various portable multimedia reproducing apparatuses and then may be reproduced in the portable multimedia reproducing apparatuses. Thus, the number of use possibilities of the contents may be greatly increased.

While the present invention has been particularly shown and described with reference to exemplary embodiments thereof, it will be understood by one of ordinary skill in the art that various changes in form and details may be made therein without departing from the spirit and scope of the invention as defined by the following claims.

The invention claimed is:

1. A digital media contents protecting system for protecting a first container including an information region including information about the contents and a payload region including a payload with the contents, said system comprising:
   a packager for analyzing a format of the contents in the container and encoding at least a portion of a data region located in a payload of the contents, and for generating encoded contents by inserting encoding information comprising at least one of an encoding key value and contents information into the information region to maintain the container; and
   a digital rights management (DRM) server receiving a request for a license and the encoding information from the external device, for confirming the encoding information and then generating a license which is used to decode the encoded contents, and for providing the generated license to the external device; and a content server, which is disposed in a backend of the packager, for receiving the encoded contents from the packager and then storing the encoded contents, and for providing the stored contents in response to an external request;
wherein the packager includes:
- a format analyzing unit for classifying a format of the contents;
- a payload data extracting unit for extracting a portion to be encoded from among the data region located in the payload, depending on a kind of the format of the contents;
- a data encoding unit for encoding the portion extracted in the payload data extracting unit, by using a predetermined key;
- an encoding information generating and inserting unit for generating the encoding information by encoding information including key information used for encoding and contents identifier information, and for inserting the encoding information into a information region of the contents; and
- an encoding information managing unit for managing the key information used in the data encoding unit and the encoding information generating and inserting unit.

2. The system of claim 1, wherein an encoding operation for the data region and an encoding operation for the encoding key and contents information each are performed by using different encoding methods.

3. The system of claim 1, wherein the encoding information further comprises location information of the DRM server, which is used to obtain the license.

4. The system of claim 1, wherein the packager encodes data located in the payload so that a size of encoded data generated by encoding the data is the same as that of the data.

5. The system of claim 1, further comprising a user terminal for receiving the encoded contents generated in the packager and reproducing the encoded contents,
wherein the user terminal comprises a DRM filter for extracting the encoding information from the encoded contents and providing the extracted encoding information and the request for the license to the DRM server, and for receiving the license from the DRM server and then decoding the encoded contents.

6. The system of claim 5, wherein the user terminal further comprises a reproducing unit for reproducing contents decoded through the DRM filter.

7. The system of cairn 5, wherein the DRM filter confirms whether a previously received license exists in the user terminal or a separately provided license exists, and, if a corresponding license exists, decodes the encoded contents by using the corresponding license.

8. The system of claim 5, wherein the user terminal comprises a plurality of user terminals each including the DRM filter,
wherein a license received by a first user terminal of the plurality of user terminals is stored in a file form and then copied to a second user terminal of the plurality of user terminals, and the second user terminal decodes the encoded contents by using the copied license.

9. The system of claim 5, wherein the DRM filter comprises:
- an encoding information extracting unit for extracting the encoding information from the encoded contents;
- a DRM server connecting unit for providing the extracted encoding information to the DRM server, and for receiving the license from the DRM server;
- a packet decoding unit for decoding the encoded contents by using the received license; and
- a license storing unit for storing the received license.

10. The system of claim 1, wherein the DRM server comprises:
- an encoding information decoding unit for performing a decoding operation on the encoding information provided from the external device;
- an information/identifier confirming unit for confirming key information and a contents identifier, which are included in the decoded encoding information; and
- a license generating unit for generating a license, which is used in decoding of the encoded contents, and providing the license to the outside, depending on a result of the confirming.

11. The system of claim 1, wherein the format of the contents which are encoded by the packager comprises at least one of an audio video interleave (AVI), a moving picture experts group 2-transport stream (MPEG2-TS), a flash video (FLV/FLA), and a window media audio(WMA)/window media video(WMV)/advanced system format(ASF).

12. A method of protecting digital media contents whose container includes an information region including information about the contents and a payload region including a payload with the contents, the method comprising;
- receiving, by a packager, the contents;
- analyzing a format of the received contents;
- extracting a portion to be encoded from among a data region located in the payload, depending on a kind of the format of the contents;
- encoding the extracted portion by using a predetermined key;
- generating encoding information including key information used for encoding the extracted portion, and content identifier information;
- inserting said encoding information into an information region, which is added to the contents or is changed, of the contents to maintain the container of the contents;
- managing the key information;
- storing encoded contents including the encoded data and the encoding information in a content server;
- providing the encoded contents to an external device;
- receiving, by a digital rights management (DRM) server, a request for a license from the external device; and
- receiving the encoding information from the external device, confirming the received encoding information and then generating a license, and providing the generated license to the external device.

13. The method of claim 12, wherein the external device comprises a user terminal for receiving the encoded contents and then reproducing the contents, the method further comprising:
- receiving, by the user terminal, the license from the DRM server; decoding the encoded contents by using the received license; and reproducing the decoded contents.

14. The method of claim 13, further comprising storing the encoded contents and the received license,
wherein, when reproducing the encoded contents again, the user terminal confirms whether a license corresponding to the encoded contents has been stored, and, if the license has been stored, decodes the encoded contents by using the license.

15. The method of claim 13, wherein the encoded contents generated in the packager are provided to the user terminal through the contents server and a streaming server.

* * * * *